United States Patent [19]

Yamada et al.

[11] Patent Number: 5,055,937
[45] Date of Patent: Oct. 8, 1991

[54] REMOTE CONTROLLER FOR TWO VTR'S

[75] Inventors: Yasuyuki Yamada, Kawasaki; Tadashi Ueki, Yokohama, both of Japan

[73] Assignee: Victor Company of Japan, Ltd., Yokohama, Japan

[21] Appl. No.: 426,719

[22] Filed: Oct. 26, 1989

[30] Foreign Application Priority Data

Oct. 26, 1988 [JP] Japan .................. 63-270047

[51] Int. Cl.⁵ ............................................ H04N 5/782
[52] U.S. Cl. .................................... 358/335; 360/14.1
[58] Field of Search ..................... 358/194.1, 335, 310; 360/13, 14.1–15

[56] References Cited

U.S. PATENT DOCUMENTS 4,543,618  9/1985  Sato ....................................... 360/15

Primary Examiner—Robert L. Richardson
Attorney, Agent, or Firm—Fleit, Jacobson, Cohn, Price, Holman & Stern

[57] ABSTRACT

A single unit remote controller adapted to control predetermined functions of first and second video tape recorders (VTR) connected each other for performing a signal transfer between the first and second VTRs is disclosed. The first VTR is preconditioned to be responsive exclusively to a first remote control code signal (code A) and the second VTR is preconditioned to be responsive exclusively to a second remote control code signal (code B) to perform the predetermined functions. The single unit remote controller comprises function keys corresponding to the predetermined functions of the first and second VTRs for commanding remotely the predetermined functions, code generation unit for generating the code A and code B combined in sequence with an interruption of a predetermined time period therebetween in response to a depression of a specific key of the function keys, and, transmission unit for transmitting the code A and code B generated by the code generation means to the first and second VTRs.

5 Claims, 4 Drawing Sheets

REMOTE CONTROLLER FOR TWO VTR'S

BACKGROUND OF THE INVENTION

This invention relates to a remote controller, and more particularly to a remote controller operative to transmit two kinds of remote control signals of different formats (system codes) to control various operations, such as, for example, an operation at the time of dubbing using two video tape recorders together.

Hitherto, in the case of, e.g., using two video tape recorders (VTRs) of the same manufacturer to record information signals (video signals and audio signals) of the master tape reproduced by one VTR onto the slave tape by the other VTR, i.e., conducting a so-called dubbing, as a matter of course, one VTR and the other VTR are required to be set in a reproducing mode and in a recording mode, respectively.

VTRs of the same manufacturer are ordinarily designed to be operated by a remote control signal (remote control code) having a common system code.

FIG. 5 is a waveform diagram showing an example of the remote control signal, wherein the remote control signal is in the form of a remote control code consisting of a system code of, e.g., 8 bits a data code of, e.g., 8 bits.

It is now assumed that an attempt is made to conduct an operation for allowing two VTRs to be in respective modes using a remote control transmitter (which will be simply called a remote controller hereinafter) at the time of dubbing. In such a case, since the both VTRs are products of the same manufacturer, so they are operative in accordance with a remote control code having the common system code (a signal of the same format), when a remote control is conducted, two VTRs are inevitably brought into the same mode of functions. This results in difficulty such that it becomes impossible to control at a time two VTRs each for different operation by one remote controller.

It is to be noted that also in the case where two VTRs used at the time of dubbing are not products of the same manufacturer, if they are of the type operative in accordance with a remote control code having the same system code, similar problem would occur.

In view of this, various manufacturers adopt the following technique: On the side of the remote controller, there is provided a changeover switch which enables to transmit selectively one, at a time, of two or more kinds of remote control codes respectively having different system codes (formats) each of the different system codes remote controls corresponding one selected VTR. In order to receive the selected remote control code transmitted by such remote controller, the VTR is provided a changeover switch which enables to receive selectively the two or more kinds of remote control codes one of which is selected for the VTR by the remote controller so that two remote control links are established between one remote controller and two VTRs. Such VTRs have been already commercially available.

When conducting a dubbing operation using two such VTRs, the reproducing side VTR is switched so that it is operative only with a remote control code (code A) having a system code (format) of the kind "A", and the recording side VTR is switched so that it is operative only with a remote code (code B) having a system code (format) of the kind "B" different from "A".

On the other hand, the remote controller is operated to transmit the remote control code (code A) having the system code (format) of the kind "A" to thereby operate the reproducing side VTR so that only this VTR is in the reproducing mode, then the changeover switch of the remote controller is flipped to transmit the remote control code (code B) having the system code (format) of the kind "B" to thereby operate the recording side VTR so that only this VTR is in the recording mode. When this is the case, manipulating the changeover switch on the remote controller for controlling the two VTRs selectively is troublesome, so that an erroneous operation is likely to occur.

Furthermore, as camera integrated VTRs, etc. have become popular, there are increasing instances where dubbing is desired using two VTRs in the ordinary home, and an editing device of a kind is available for the purpose. However, there exists a need to simply conduct a dubbing without using such an editing device for the purpose of deleting unnecessary program portions on a recorded video tape by using two conventionally available VTRs having no changeover switch on the remote controller as mentioned before. If this is the case, it is required to operate, at the time of dubbing, two remote controllers one for the recording side VTR and the other for reproducing side VTR. Thus, the operation becomes complicated and an erroneous manipulation of the two remote controllers is likely to occur, and this takes extra time for dubbing.

SUMMARY OF THE INVENTION

An object of this invention is to provide a remote controller which is difficult to erroneously operate by simplifying the operation, and which is particularly capable of stably and securely carrying out the operation at the time of dubbing, and which is capable of operating two units or devices by one remote controller.

According to the present invention, there is provided a single unit remote controller adapted to control predetermined functions of first and second video tape recorders (VTR) connected each other for performing a signal transfer between the first and second VTRs, the first VTR being preconditioned to be responsive exclusively to a first remote control code signal (code A) and the second VTR being preconditioned to be responsive exclusively to a second remote control code signal (code B) to perform the predetermined functions, the single unit remote controller comprising: function keys corresponding to the predetermined functions of the first and second VTRs for commanding remotely the predetermined functions, code generation means for generating the code A and code B combined in sequence with an interruption of a predetermined time period therebetween in response to a depression of a specific key of the function keys, and, transmission means for transmitting said code A and code B generated by the code generation means to the first and second VTRs.

In accordance with the remote controller according to this invention, there is no need to purposely switch two kinds of remote control signals. Namely, in accordance with the operation by a single operating key, two kinds of combined remote control signals are automatically transmitted interchangeably to the reproducing device or the recording device which can receive respective remote control signals. Thus, the operation becomes simplified, and erroneous operation is made less likely to occur.

Furthermore, since the time intervals between respective remote control signals transmitted vary depending upon the kind of operating keys, particularly at the time of dubbing using the reproducing device and the recording device, e.g., even in the case where the operations of the rotary drum and/or the capstan, etc. are not stable immediately after the search operation, it is possible to shift to the next operation after the above-operations are stabilized. Thus, dubbing operation can be stably and securely conducted.

Furthermore, various operations of the reproducing device can be controlled in the edit mode, and various operations of the recording device can be controlled in the ordinary mode. In addition, switching control of various operations of the reproducing device or the recording device can be conducted only by effecting switching between the edit mode and the ordinary mode. Accordingly, e.g., at the time of dubbing, shift to an operation for confirming the state of the recording signal in the recording device can be easily carried out, resulting in an improvement in operability.

DESCRIPTION OF THE PREFERRED EMBODIMENT

A preferred embodiment of a remote controller according to this invention will now be described with reference to the attached drawings.

Figure 1:
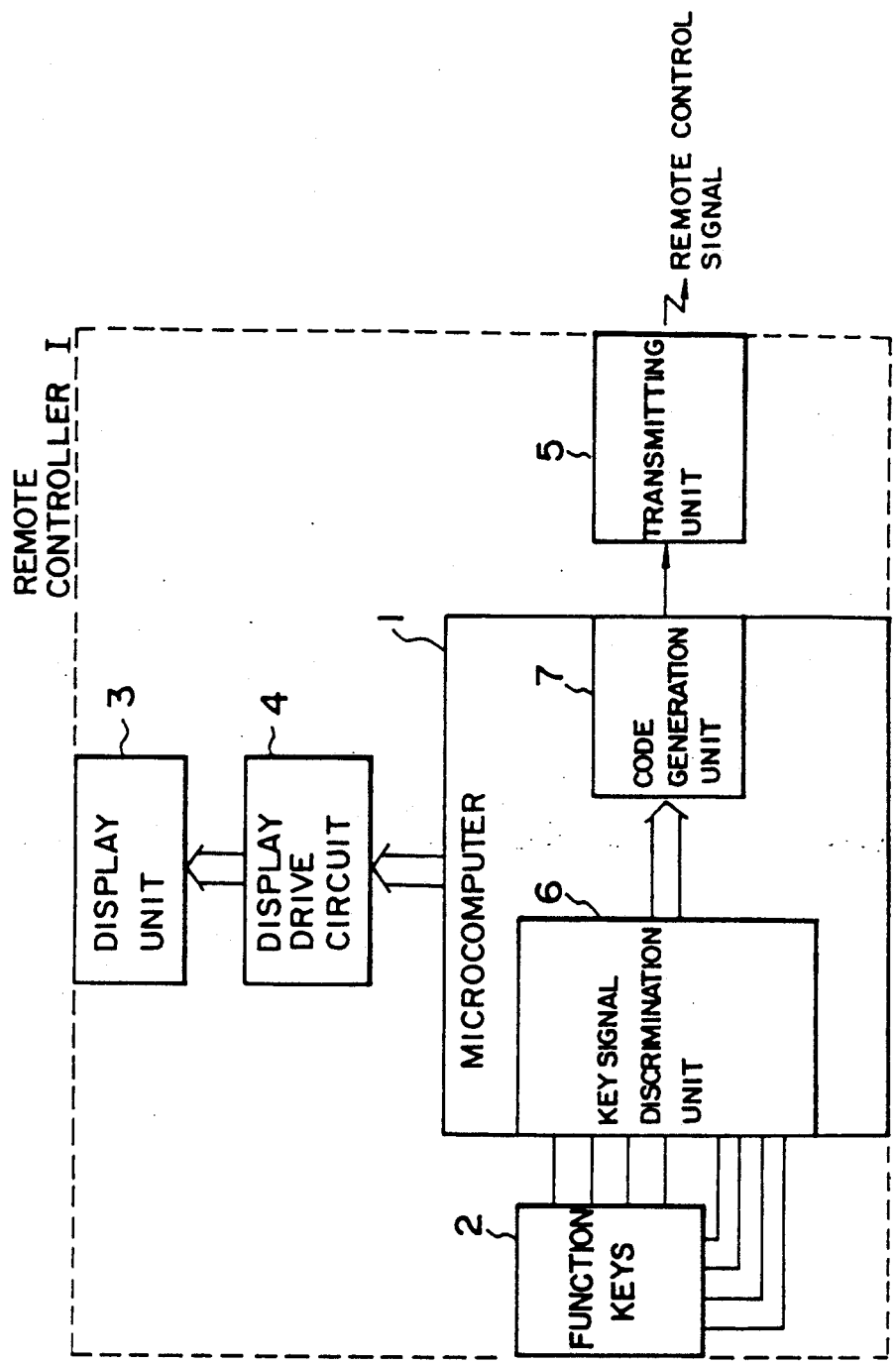
FIG. 1 is a block diagram showing functionally an arrangement of an embodiment of a remote controller according to this invention.

FIG. 1 is a block diagram showing functionally an arrangement of an embodiment of a remote controller according to this invention.

As shown in this figure, the remote controller I is composed of a microcomputer 1, an operating key 2, a display unit 3, a display drive circuit 4, and a sending or transmitting unit 5.

The function keys 2 includes keys for controlling various operations of VTR (stand by key, stop key, reproduction or playback key, recording picture key, temporary stop key, rewind key, fast feed key, speed adjust key, take-out key, and power supply key, etc.). Also provided to the remote controller I are keys for changing the remote controller into "edit mode" and "normal mode" with which different code signals for transmission are selectable by another key.

A key signal generated in correspondence with the operation of each key of the function keys 2 is delivered to a key signal discrimination unit 6 in the microcomputer 1. The key signal discrimination unit 6 discriminates the kind of key signal delivered in response to manipulation of the function keys 2 and send it to a code generation unit (e.g., ROM Table, etc.) 7 in the microcomputer 1 as data (e.g., address data) indicative of the discriminated result. Thus, the code generation unit 7 generates a corresponding code to deliver it to the transmission unit 5.

Figure 5:
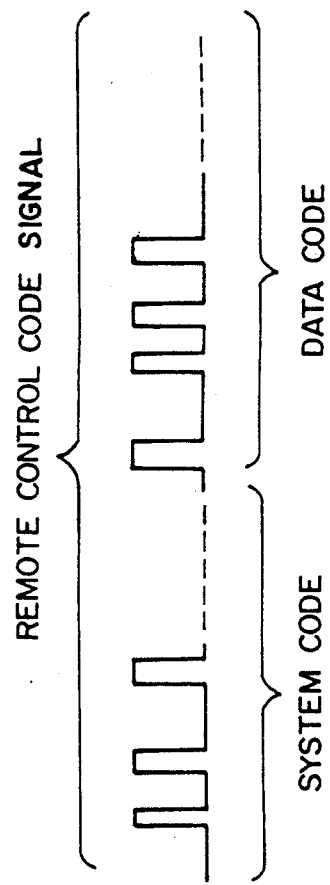
FIG. 5 is a waveform diagram showing an example of a remote control signal.

The transmission unit 5 transmits, as an infrared ray, a remote control signal (remote control code) as shown in FIG. 5 on the basis of the code delivered from code generation unit 7. The remote control signal of the infrared ray is emitted toward the remote control reception window on the front surface of VTR.

Furthermore, the operation of the microcomputer 1 is displayed on the display 3 comprised of liquid crystal device (LCD) driven by the display drive circuit 4.

Figure 2:
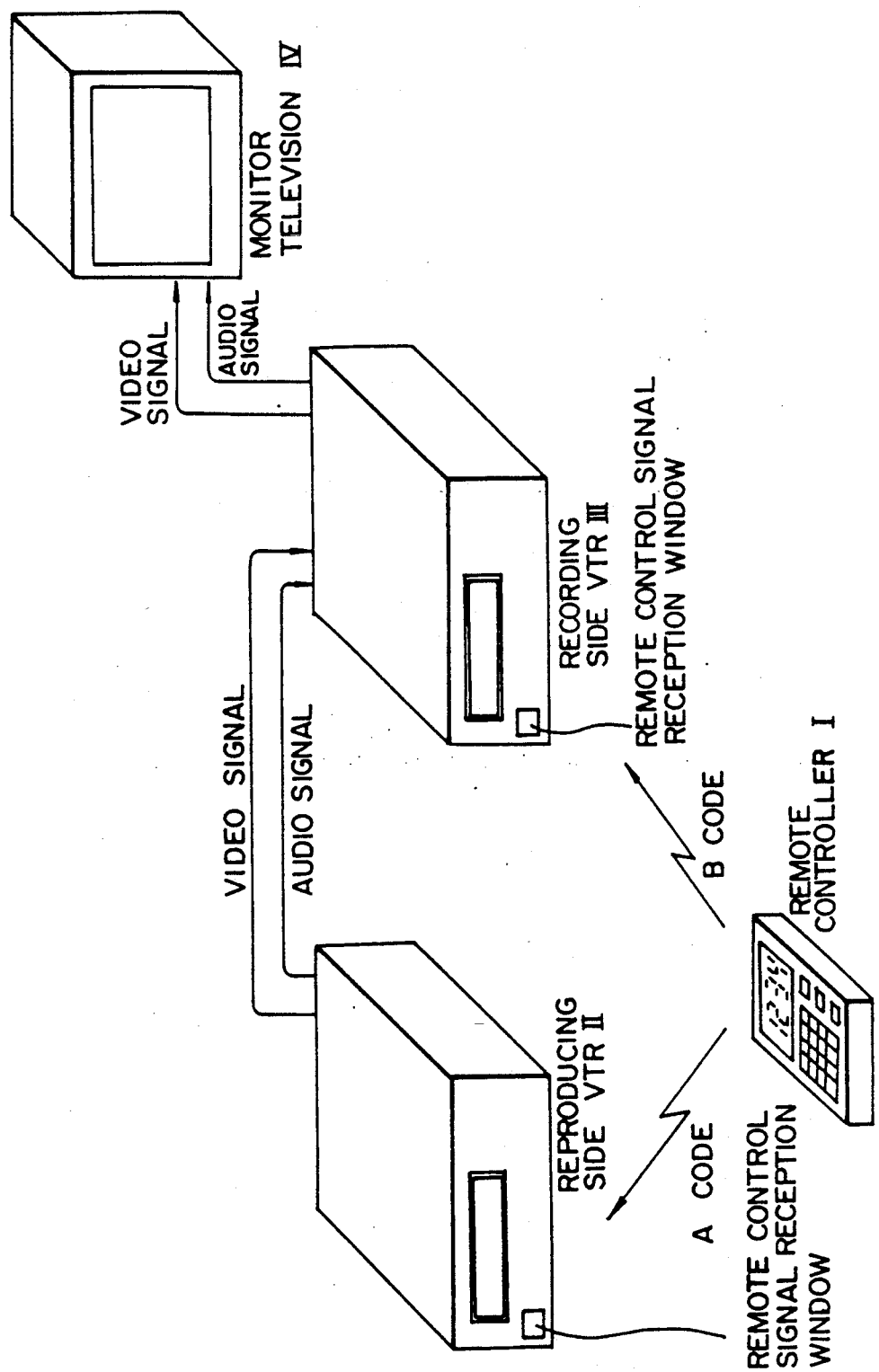
FIG. 2 is a perspective view showing an example in which a remote controller according to this invention is applied.

FIG. 2 is a perspective view showing an arrangement in the case of carrying out dubbing using two VTRs operated by the remote controller. The both VTRs are of the type which is capable of receiving either of the two different remote control code signals where the selection of the different remote control code signals is performed by the changeover switch provided on the VTRs as described before or the type which is automatically switched to one of the two remote control code signals in response to the incoming remote control code signal received first after the power supply cord of the VCR is plugged into a wall socket.

The VTRs II and III in the following description are assumed to be this automatic selection type unless otherwise specified.

As shown in this figure, the reproducing side VTR II and the recording side VTR III are interconnected by the cables for transmission of video signals and audio signals. A video signal and an audio signal, which are reproduced by the reproducing side VTR II and are output therefrom, are delivered to the recording side VTR III, at which these signals are recorded.

Furthermore, a monitor television IV is connected to the recording side VTR III. Thus, the reproduced signal obtained from the reproducing side VTR II and the signal recorded by the recording side VTR III can be monitored.

The remote controller I controls various operations of the two VTRs II and III in response to the manipulation of the respective operating keys.

It is now assumed that dubbing is conducted using two VTRs II and III. First, power supply (AC) of the reproducing side VTR II is turned on, then upon selecting the "normal" mode on the remote controller I, a remote control signal A (code A) having a system code of the kind "A" is transmitted from the remote controller I. Thus, the VTR II is initialized to be formatted to the kind "A". Secondary, the recording side VTR III is turned on, and with the remote controller I in the "normal" mode a remote control signal B (code B) having a system code of the kind "B" is transmitted from the remote controller I by switching the remote controller I to transmit the signal. Thus, the recording side VTR III is initialized to be formatted to the kind B.

Thus, at times subsequent thereto, the reproducing side VTR II can receive only a remote control signal of the code A, and the recording side VTR III can receive only a remote control signal of the code B. This enables the single remote controller I controls the two VTRs II and III individually without confusing them at the time of dubbing.

It is to be noted that, in place of using VTRs II and III of such automatic switching type for initialization, VTRs having the changeover switch for selecting manually a desired code format as described before, may be used for the VTRs II and III. If this is the case, no initializing operation by the remote controller I in the "normal" mode is necessary. The same is true when only one of the VTRs II and III has the changeover switch which enables the VTR changed to other code format than another VTRs.

After the initialization of the VTRs II and III which are now receivable only the code A and the code B respectively, the mode of the remote controller is switched to "edit mode".

Figure 4:
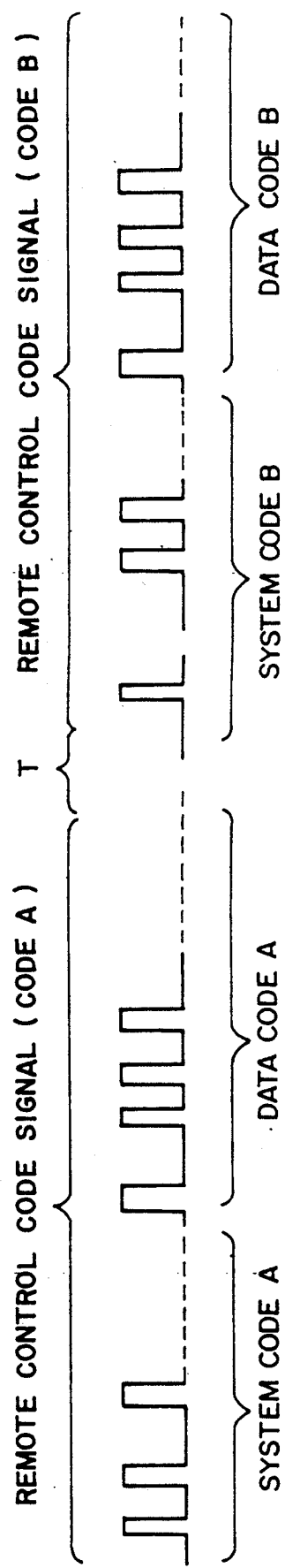
FIG. 4 is a waveform diagram showing an example of a remote control signal transmitted from the device according to this invention.

In the "edit mode", the remote controller I is made operative in such a way that depression of one function key combines, desired remote control code signals of A and B as shown in FIG. 4, according to the program of the microcomputer 1 in the remote controller I, i.e. the remote control signal of the code A which can be received by the reproducing side VTR II and the remote control signal of the code B which can be received by the recording side VTR III are combined and transmitted time sequentially, in which a time interval T between respective remote control signals of different operational functions is varied depending upon the depressed function key. In this arrangement, depression of one function key of the remote controller I triggers and controls various operations of both the reproducing side VTR II and the recording VTR III. It is of course possible that the code A and the code B are assigned reversely to the VTRs II and III.

Combinations of transmission codes (remote control signals) corresponding to function keys of the remote controller I and the sequence of transmission will now be described in a practical sense.

Turning back to FIG. 4, the remote control signal A (code A) and the remote control signal B (code B) are generated and combined with the time interval T therebetween by the microcomputer 1 in FIG. 1. For generating the time interval T, the microcomputer functions as a timer. Each of the remote control signals is a series of code pulses comprising 8 bits of data code A (B) preceded by 8 bits of system code A (B) as shown. When received by the VTRs II and III, VTR II identifies the system code A and responds to the subsequent data code A and performs the functions accordingly as commanded by the remote controller, but does not respond to the subsequently transmitted data code B as the preceding system code B is different from the system code A. In the same manner, the VTR III identifies the system code B and responds to the data code B and does not respond to the data code A. According to this arrangement, the VTR II operates in response to the code A for playback of such remote control signals, and the VTR III operates in response to the code B for picture recording. Table 1 collectively represents the key functions and the sequence of transmission codes by the operations thereof. In Table 1, [P] and [R] represent the code signal received by the playback or reproducing side VTR and the recording side VTR, respectively. (See Table 1 for a better understanding of the following description.)

TABLE 1

| [EDIT MODE] | |
| --- | --- |
| DEPRESSED FUNCTION KEY | SEQUENCE OF TRANSMISSION CODES |
| ① STANDBY | [P] STOP → [R] PICTURE RECORDING → TEMPORARY STOP → [P] PLAYBACK → [P] PLAYBACK TEMPORARY STOP |
| ② TEMPORARY STOP | [R] PICTURE RECORDING TEMPORARY STOP → [P] PLAYBACK TEMPORARY STOP |
| ③ PLAYBACK | [R] PICTURE RECORDING TEMPORARY STOP → [P] PLAYBACK |
| ④ REWIND (SEARCH) | [R] PICTURE RECORDING TEMPORARY STOP → [P] REWIND (IN THE CASE OF CONTINUOUS DEPRESSION OF THE REWIND KEY) . . . [P] REWIND → [P] REWIND |
| ⑤ FAST FEED (SEARCH) | [R] PICTURE RECORDING TEMPORARY STOP → [P] FAST FEED (IN THE CASE OF CONTINUOUS DEPRESSION OF THE FAST FEED KEY) . . . [P] FAST FEED → [P] FAST FEED → . . . |
| ⑥ SPEED INCREASE | [R] PICTURE RECORDING TEMPORARY STOP → [P] SPEED INCREASE |
| ⑦ SPEED DECREASE | [R] PICTURE RECORDING TEMPORARY STOP → [P] SPEED DECREASE |
| ⑧ TAKE OUT (EJECT TAPE CASSETTE) | [R] PICTURE RECORDING TEMPORARY STOP → [P] EJECT TAPE CASETTE |
| ⑨ STOP | [R] PICTURE RECORDING TEMPORARY STOP → [P] STOP |
| ⑩ POWER SUPPLY | [R] POWER SUPPLY ON/OFF ALTERNATELY → [P] POWER SUPPLY ON/OFF ALTERNATELY |
| ⑪ EDIT START | CONDITION OF THE VTR SUBJECTED TO THE CODE TRANSMITTED PRIOR TO THE "EDIT START" / SEQUENCE OF TRANSMISSION CODE |
| a) PLAYBACK | [R] PLAYBACK TO RELEASE PICTURE RECORDING TEMPORARY STOP AND RESUME RECORDING |
| b) TEMPORARY STOP | [P] PLAYBACK → INTERRUPT TRANSMITTING CODE SIGNAL FOR 0.5 SEC. → [R] PLAYBACK OR [P] PLAYBACK TEMPORARY STOP → INTERRUPT TRANSMITTING CODE SIGNAL FOR (5-Ta) SEC. → [P] PLAYBACK → INTERRUPT TRANSMITTING CODE SIGNAL FOR 0.5 SEC. → [R] PLAYBACK (RESUME RECORDING) Ta: elapsed time from the transmission of TEMPORARY STOP to the transmission of EDIT START. |
| c) SEARCH | [P] PLAYBACK TEMPORARY STOP → INTERRUPT TRANSMITTING |

TABLE 1-continued

[EDIT MODE]

CODE SIGNAL FOR 5 SEC. → [P] PLAYBACK → INTERRUPT TRANSMITTING CODE SIGNAL FOR 0.5 SEC. → [R] PLAYBACK (RESUME RECORDING)

NOTE: The VTRs are generally designed in such a way that temporary stopped recording mode is released to resume recording in response to the "PLAY" command which simply activates the transport mechanism to start running the tape.

(1) In the case where the standby key is depressed:

A remote control signal of the A code for stopping the playback side VTR II (hereinafter abbreviated as "P") (a remote control signal similar to the above is simply represented as a "stop code") is transmitted to the P. After 0.5 seconds of interruption, a picture recording temporary stop code is transmitted to the recording side VTR III (hereinafter abbreviated as "R"). Further interruption of 0.5 seconds thereafter, the playback code is transmitted to P. Then another interruption of 0.5 seconds thereafter, a playback temporary stop code is transmitted to P. Eventually, R is brought into the picture recording temporary stop state and P is brought into the playback temporary stop state.

(2) In the case where the temporary stop key is depressed:

A picture recording temporary stop code is transmitted to R. After 0.5 seconds of interruption, a playback temporary stop code is transmitted to P.

(3) In the case where the playback key is depressed:

A picture recording temporary stop code is transmitted to R. After 0.5 seconds of interruption, a playback code is transmitted to P.

(4) In the case where the rewind (search) key is depressed:

A picture recording temporary stopcode is transmitted to R. After 0.5 seconds of interruption, a rewind code is transmitted to P. Furthermore, in the case where the rewind (search) key is kept depressed, a rewind code is transmitted repeatedly to P at time intervals of 0.5 seconds.

(5) In the case where the fast feed (search) key is depressed:

A picture recording temporary stop code is transmitted to R. After 0.5 seconds of interruption, a fast feed code is transmitted to P. Furthermore, in the case where the fast feed (search) key is kept depressed, the fast feed code is transmitted repeatedly to P at time intervals of 0.5 seconds.

(6) In the case where the speed increase key is depressed:

A picture recording temporary stop code is transmitted to R. After 0.5 seconds of interruption, a speed increase code is transmitted to P.

(7) In the case where the speed decrease is depressed:

A picture recording temporary stop code is transmitted to R. After 0.5 seconds of interruption, a speed decrease code is transmitted to P.

(8) In the case where the take-out key is depressed:

A picture recording temporary stop code is transmitted to R. After 0.5 seconds of interruption, a take-out code is transmitted to P. The tape cassette is then ejected.

(9) In the case where the stop key is depressed:

A picture recording temporary stop code is transmitted to R. After 0.5 seconds of interruption, a stop code is transmitted to P. It is to be noted that "edit mode" is not released in this case.

(10) In the case where the power supply key is depressed:

A power supply on/off code is transmitted to R. After 0.5 seconds of interruption, the power supply on/off code is transmitted to P.

It should be noted that either of the VTR II or III is in this power off state, the VTR is kept receivable of at least remote control signals as far as its power cord is plugged into a wall socket.

Figure 3:
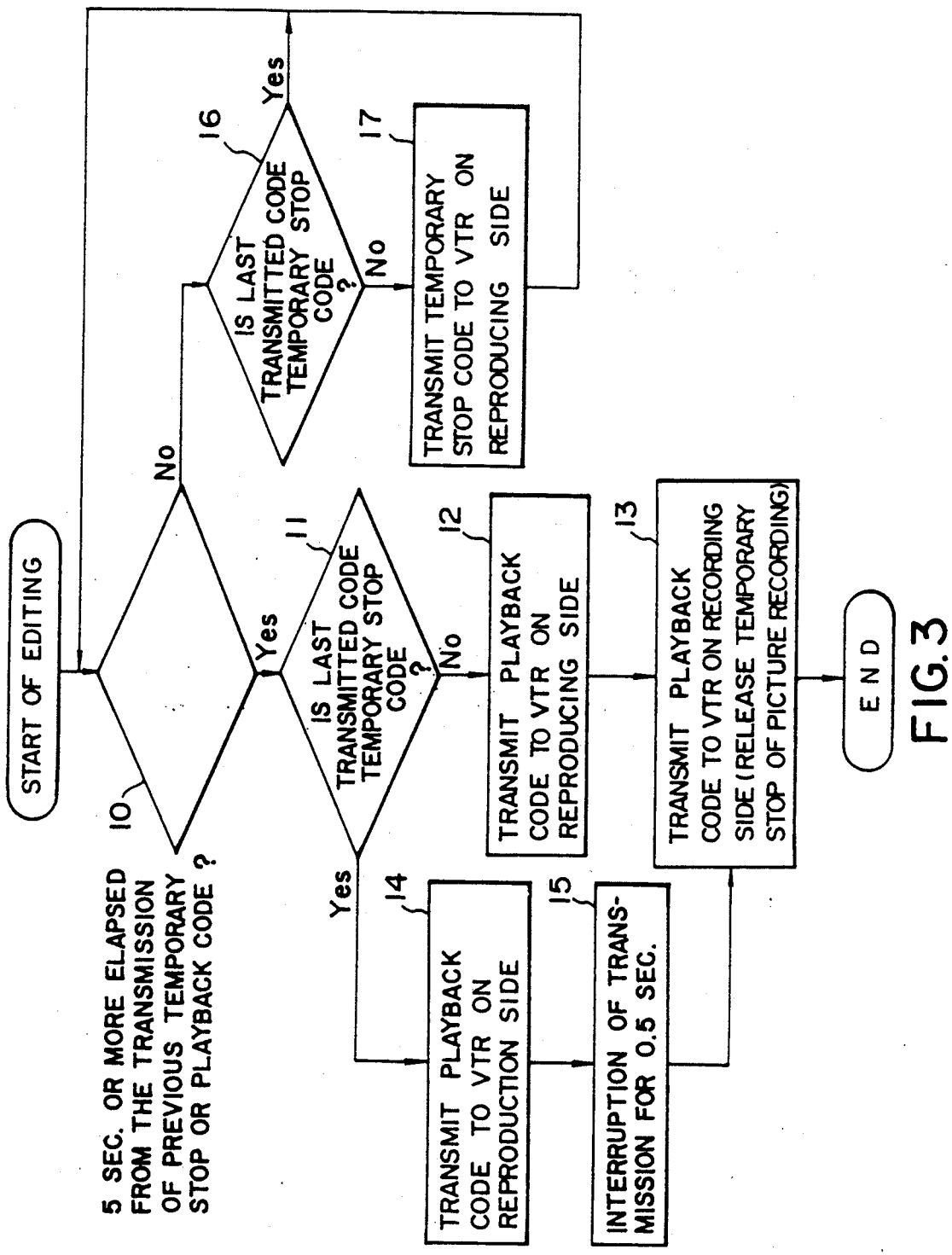
FIG. 3 is a flow chart for explaining the operation of a remote controller according to this invention.

(11) In the case where the edit start key is depressed:

The sequence of transmission codes changes depending on which of the transmission codes according to the Table 1 is received by P prior to the depression of the "edit start" key. The operation in this case is shown in the flowchart in FIG. 3.

a) In the case where the prior transmission code is the playback code: a procedure is taken to execute ["YES" of step 10 in FIG. 3→"NO" of step 11→step 12], then the playback code is transmitted to R [step 13] to release the picture recording temporary stop state, thus R resumes the picture recording.

b) In the case where the prior transmission code is the temporary stop code: a procedure is taken to execute ["YES" of step 10 in FIG. 3→"YES" of step 11], then the playback code is transmitted to P [step 14], after 0.5 seconds of interruption, [step 15], the playback code is transmitted to R [step 13] to release the picture recording temporary stop state, thus allowing R to resume the picture recording.

If the temporary stop code or playback code is given to the VTRs subsequent to the search code (REWIND or FAST FEED), and the edit start code is given Ta seconds (Ta<5 seconds) after the transmission of the temporary stop code or playback code, a procedure is taken to execute ["NO" of step 10 in FIG. 3→"NO" of step 16], then the playback temporary stop code is transmitted to P [step 17], then (5−Ta) seconds of interruption i.e. the steps 10→16→17 are repeated for (5−Ta) seconds to reach 5 seconds then the procedure of →["YES" of step 10→"YES" of step 11] is executed, then the playback code is transmitted to P in the same manner as stated above [step 14], after further interruption of 0.5 seconds [step 15], the playback code is transmitted to R [step 13] to release the picture recording temporary stop state, thus allowing R to resume the picture recording.

c) In the case where the prior transmission code is the search code (rewind code, fast feed code): a procedure is taken to execute ["NO" of step 10 in FIG. 3→"NO" of step 16] the playback temporary stop code is transmitted to P [step 17], then 5 seconds of interruption is taken until ["YES" of step 10] is executed then proceed to ["YES" of step 11], then the playback code is transmitted to P in the same manner as stated above [step 14], after further 0.5 seconds of interruption [step 15] the playback code is transmitted to R [step 13], to release the picture recording temporary stop state, thus allowing R to resume the picture recording.

The reason why the 5 seconds of interruption is provided when the prior code is the search code and the "edit start" key is depressed is as follows.

When the reproducing side VTR II is in the search mode (REWIND or FAST FEED), the reproduced video signal has a vertical synchronizing signal interval shorter than the standard interval as the tape is running faster than the standard speed, whereas the recording side VTR III is generally designed to control its drum speed synchronized with the vertical synchronizing signal of the inputted video signal. Because of this, when the connected reproducing side VTR II is in the search mode and feeding the reproduced signal accordingly, the drum speed of the recording VTR III is out of the standard speed, possibly much faster. Due to this design which is quite common to many VTRs, it takes about 5 seconds for the drum speed control servo system of the VTR III running its head drum faster than the standard speed, to bring the drum speed down to the normal speed in response to the newly inputted video signal from the VTR II switched from the search mode to the normal play mode.

Accordingly, in response to the remote control signals given to the reproducing VTR II shown in the "edit start" column (C) of the TABLE 1, the reproducing side VTR II is first put into the PLAYBACK TEMPORARY STOP mode for 5 seconds, in which a still picture is reproduced and fed to the recording side VTR III, by responding to the incoming still picture signal, the drum speed of the VTR III is brought to a nearly standard speed during this 5 seconds. Secondary, the VTR II is put into the PLAY mode so as to reproduce, at the normal speed, the video signal to be recorded, but the VTR III does not start recording operation concurrently, instead, it starts 0.5 seconds after the playback start of the VTR II as the PLAYBACK (RESUME RECORDING) code is given the VTR III 0.5 seconds later. This 5 seconds of interruption is reduced by Ta seconds, if the temporary stop code is transmitted Ta seconds prior to the edit start code transmission by manipulating the temporary stop key for monitoring a still picture after searching pictures to find an editing point.

Furthermore, as shown in Table 1, in the "edit mode", when the reproducing VTR II is operated in response to the keys of ② to ⑨, the recording side VTR III is put into the picture recording temporary stop state (stand by for recording) this means that the reproducing side VTR II is allowed to be operable with much flexibility, i.e. recorded pictures on the tape in the VTR II can be searched, temporary stopped etc. while being observed on the screen of the monitor television to find desired editing points for eventual dubbing operation (independent of the recording side VTR III).

Furthermore, when the remote controller I is in the "normal mode" either of the code A or code B is able to be transmitted selectively with a manipulation of the key for this A-B switching, and all the function keys except for ① the stand by key and ⑪ the edit start key. Thus, both the VTR II and VTR III become operable with other function keys on the remote controller I.

In order to ensure secure operations of the VCR II and VCR III in response to those remote control signals, codes maybe repeated plural times within one transmission of the remote control signals combined or not combined.

What is claimed is:

1. A single unit remote controller adapted to control predetermined functions of first and second video tape recorders (VTR) connected each other for performing a signal transfer between the first and second VTRs, said first VTR being preconditioned to be responsive exclusively to a first remote control code signal (code A) and said second VTR being preconditioned to be responsive exclusively to a second remote control code signal (code B) to perform said predetermined functions, said single unit remote controller comprising:
    function keys corresponding to said predetermined functions of the first and second VTRs for commanding remotely said predetermined functions,
    code generation means for generating said code A and code B combined in sequence with an interruption of a predetermined time period therebetween in response to a depression of a specific key of the function keys, and,
    transmission means for transmitting said code A and code B generated by said code generation means to said first and second VTRs.

2. A single unit remote controller as claimed in claim 1 wherein said specific key is an editing start key for commanding said first and second VTRs to perform said signal transfer.

3. A single unit remote controller as claimed in claim 1 further comprising:
    mode changeover means for disabling said code generation means generating said code A and code B combined in sequence with the interruption therebetween, and enabling said code generation means generating only one of the code A and the code B to control corresponding one of the first and second VTRs at a time upon depression of one of the function keys.

4. A single unit remote controller as claimed in claim 3, wherein said mode changeover means comprising a first key for selecting one of the code A and the code B to be transmitted, and a second key for generating only one code selected by a depression of the first key.

5. A single unit remote controller as claimed in claim 2, wherein each of the code A and the code B is headed by a system code followed by a data code, said system code causing a corresponding VTR of the first and second VTRs responding to said data code when said first and second VTRs receive said codes A and B.

* * * * *